(12) United States Patent
Chen et al.

(10) Patent No.: US 6,331,582 B1
(45) Date of Patent: Dec. 18, 2001

(54) LOW GLOSS COATING

(75) Inventors: Augustin T. Chen, Cheshire, CT (US); Paul E. Kestyn, Greenfield; Hong Zhao, Millbury, both of MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 09/541,644

(22) Filed: Apr. 3, 2000

Related U.S. Application Data

(60) Provisional application No. 60/132,072, filed on May 3, 1999.

(51) Int. Cl.$^7$ .................................................... C08K 3/11
(52) U.S. Cl. ..................... 523/400; 525/165; 525/222; 525/231; 525/529
(58) Field of Search ............................ 523/412, 400; 525/165, 222, 231, 529

(56) References Cited

U.S. PATENT DOCUMENTS

| | | | |
|---|---|---|---|
| 3,165,423 | 1/1965 | Caldwell et al. | 117/135.5 |
| 3,679,451 | 7/1972 | Marks et al. | 117/33.3 |
| 3,689,312 | 9/1972 | Long et al. | 117/94 |
| 3,772,236 | 11/1973 | Soons | 260/29.6 F |
| 4,138,390 | 2/1979 | Emmons et al. | 525/259 |
| 4,194,955 | 3/1980 | Nowak et al. | 522/121 |
| 4,874,636 | 10/1989 | Okita et al. | 427/130 |
| 5,218,022 | 6/1993 | North | 524/86 |
| 5,262,225 | 11/1993 | Wilson et al. | 428/203 |
| 5,521,002 | 5/1996 | Sneed | 428/331 |
| 5,580,819 | 12/1996 | Li et al. | 427/167 |
| 5,744,243 | 4/1998 | Li et al. | 428/447 |

FOREIGN PATENT DOCUMENTS

| | | | |
|---|---|---|---|
| 55012107 | 1/1980 | (JP) | C09D/5/00 |
| 61054066 | 3/1986 | (JP) | G11B/15/60 |
| 06264030 | 9/1994 | (JP) | C09D/183/06 |
| 1134586 | 1/1985 | (SU) | C08L/63/02 |
| WO 97/11119 | 3/1977 | (WO) | C08K/5/3492 |
| WO 94/17119 | 8/1994 | (WO) | C08G/59/42 |
| WO 97/08235 | 3/1997 | (WO) | C08K/5/3492 |
| WO 98/38230 | 9/1998 | (WO) | C08G/18/08 |

OTHER PUBLICATIONS

Russian paper—Tr. Mezhvuz. Konf. Primen. Plaastmass Stroit., 3$^{rd}$ (1972), Meeting Date 1970, 278–279.

*Primary Examiner*—Robert Dawson
*Assistant Examiner*—D. Aylward
(74) *Attorney, Agent, or Firm*—Lathrop & Gage L.C.

(57) ABSTRACT

A liquid surface coating composition which exhibits low gloss after curing or drying comprises binder resin other than polyvinyl acetal, pigment colorant and a gloss-reducing amount of matting agent consisting essentially of polyvinyl acetal containing acetal groups derived from one or more aliphatic or aromatic aldehydes having 1 to 10 carbon atoms, preferably polyvinyl butyral of weight average molecular weight between 10,000 to 500,000 Daltons.

11 Claims, No Drawings

LOW GLOSS COATING

This application claim benefit to provisional application No. 60/132,072 filed May 3, 1999.

BACKGROUND OF THE INVENTION

This invention relates to liquid surface coatings and more particularly to a matting agent in such coatings to reduce gloss.

Appearance coatings having good mechanical properties such as hardness, flexibility, durability, etc. with low gloss are used in vehicle interiors, furniture surfaces and the like. Low gloss is often provided by a significant amount of pigment in the coating formulation to roughen and therefore reduce surface gloss.

Silicon-containing compounds and polymers (e.g. silica, silicate and silane) and fillers such as diatomaceous earth, clays, zeolites and the like are also known to reduce gloss in surface coatings. Compositions with these components often contain significant amounts of organic solvent which render them sometimes hazardous to handle.

SUMMARY OF THE INVENTION

A primary object of this invention is to provide liquid coating compositions containing a matting agent to reduce coating gloss without adversely affecting other desirable performance properties of the coating.

These and other objects are accomplished by a liquid surface coating composition which, after curing or drying, possesses low gloss, the composition comprising in admixture:

a) a binder resin other than polyvinyl acetal resin;
b) pigment colorant; and
c) a gloss-reducing amount of a matting agent consisting essentially of polyvinyl acetal containing acetal groups derived from one or more aliphatic or aromatic aldehydes having 1 to 10 carbon atoms.

The polyvinyl acetal is preferably polyvinyl butyral having a hydroxyl group content calculated as polyvinyl alcohol of 8 to 25 wt. %, weight average molecular weight (Mw) between 10,000 and 500,000, preferrably 30,000 to 250,000, Daltons in amount in the coating composition of about 0.5 wt. % to about 25 wt. %, preferably 2 to 16 wt. %, based on the amount of binder resin.

In a more specific aspect a thermally activated curable liquid coating composition is provided comprising, in admixture:

a) crosslinking agent selected from alkoxymethylaminotriazines and polyisocyanates;
b) binder resin having functional groups coreactive with the crosslinking agent selected from the group consisting of acrylic resins, alkyd resins and polyester resins;
c) polyvinyl acetal matting agent containing acetal groups derived from one or more aliphatic or aromatic aldehydes having 1 to 10 carbon atoms; and
d) pigment colorant.

A further aspect of the invention provides an uncovered low gloss surface coating containing polyvinyl acetal matting agent in amount effective to produce a gloss reading of less than 60, preferably less than 15, using a glossmeter at an angle of sixty degrees to normal, which preferably contains crosslinked binder resin.

DETAILED DESCRIPTION OF THE INVENTION

Binder resin as used herein means organic polymer capable of forming a continuous adherent film on a substrate being coated. The organic polymer can be selected to react with a crosslinking agent during curing at elevated temperature to form a thermoset coating or be a non-crosslinkable high molecular weight thermoplastic material which, after drying removal of liquid such as solvent, forms a thermoplastic coating. Thermoplastic coatings do not contain crosslinking agent. Preferred binder resins used in high performance heat curable coatings contain functional groups coreactive with crosslinking agent and are selected from the group consisting of acrylic resins, alkyd resins, and polyester resins. These resins are particularly described in U.S. Pat. No. 5,079,315 issued Jan. 7, 1992 to Demarey, cols. 3, 4, 5 and 6, the content of which is incorporated herein by reference.

Commercially available examples of usable polyfunctional hydroxy group containing binder resins include JONCRYL® 500 acrylic resin, a product of S.C. Johnson & Sons, Racine, Wis.; ACRYLOID® AT-400 acrylic resin, a product of Rohm & Haas, Philadelphia, Pa.; CYPLEX® 1531 polyester resin, a product of Cytec Industries, West Paterson, N.J.; TONE® polyester resin, a product of Union Carbide, Danbury, Conn.; K-FLEX® XM-2304 and XM-2306 resins, products of King Industries, Norwalk, Conn.; CHEMPOL® 11-2339 and 18-2330 resin, a product of Cook Composites and Polymers, Port Washington, Wis.; JONCRYL® 540 acrylic emulsion polymer, a product of S.C. Johnson & Sons; RUCOFLEX® XR370 polyester resin from Ruco Polymer Corporation; RHOPLEX® AC-1024 acrylic emulsion resin, a product of Rohm & Haas; CRYLCOAT® 3494 solid hydroxy terminated polyester resin, a product of UCB Chemicals, Smyrna, Ga.; RUCOTE® 102 and 103 polyester resin, a product of Ruco Polymer Corporation, Hicksville, N.Y.; JONCRYL® SCX-800-A and SCX-800-B hydroxy functional solid acrylic resins, products of S.C. Johnson & Sons. Also, XC® 4005 water reducible carboxyl functional acrylic resin, a product of Cytec Industries.

Thermally activated curable coating compositions contain one or more crosslinking agents reactive with functional (e.g. hydroxyl) groups of the binder resin component of the composition at elevated curing temperatures. One class of crosslinking agents commonly employed in these reactions are the alkoxymethylaminotriazines which are methylated polyaminotriazines substantially etherified with one or more alcohols. They are prepared by reaction of polyaminotriazine with formaldehyde to methylolate at least about half the amino groups and are then alkylated or etherified by reaction with alcohol. The etherified methylolated aminotriazines are liquid and are essentially monomeric or at most oligomeric with an average degree of polymerization of no more than about 5, the aminotriazine rings being joined by methylene or methylene ether bridges formed by condensation of two methylol groups. Suitable etherified aminotriazines include those possessing a ratio of aminotriazine to combined formaldehyde in the range of about 1:(2n−3) to about 1:2n where n is the number of amino groups per triazine ring and a ratio of aminotriazine to alkyl ether groups in the range of about 1:(2n−3.5) to about 1:2n provided that on average there are at least about 1.8 alkoxymethyl groups per molecule. Melamine is a preferred aminotriazine which is potentially hexafunctional. Thus, the more preferred aminotriazine compounds are alkoxymethyl melamines in which the ratio of melamine to combined formaldehyde is in the range of 1:3 to 1:6 and the ratio of melamine to alkoxy groups is in the range of 1:2.5 to 1:6. Alcohols suitable for etherification of methylol melamine are branched or straight chain $C_1$ to $C_8$ alcohols. A mixture of alcohols such as methanol and butanol or methanol and isobutyl alcohol (2-methyl-1-propanol) can be used for etherification to make a mixed etherified amino resin. Preferred mixed ethers are methoxy/butoxy and methoxy/isobutoxy ethers. The range of the ratio of methoxy/butoxy or methoxy/isobutoxy can vary widely with about 2:1 to about 1:2 preferred. A single alcohol can also be used for etherification with methanol preferred. Aminotriazine crosslinkers are available commercially from Solutia, Inc. under the registered trademark Resimene.

Another class of crosslinking agents are polyisocyanates including blocked forms thereof which are generally well known and are extensively used in coating compositions in monomeric, oligomeric and/or polymeric form, preferably containing at least two reactive isocyanate groups. Specific examples are hexamethylene diisocyanate; 2,2,4-trimethylhexamethylene diisocyanate; 2,4,4-trimethylhexamethylene diisocyanate; meta-$\alpha,\alpha,\alpha',\alpha'$-tetramethylxylylene-diisocyanate (commercially available under the trade designation m-TMXDI® aliphatic isocyanate from Cytec Industries Inc.); para-$\alpha,\alpha,\alpha',\alpha'$-tetramethylxylylene-diisocyanate (available under the trade designation p-TMSDI® aliphatic isocyanate from Cytec Industries Inc.); 1-isocyanato-3,3,5-trimethyl-5-isocyanatomethyl cyclohexane (isophorone diisocyanate, abbreviated as IPDI); bis(4-isocyanatocyclohexyl)methane (hydrogenated MDI); biuret derivatives of various diisocyanates including, for example, hexamethylene diisocyanate (commercially available under the trade designation Desmodur® N of Miles Inc., Pittsburgh, Pa.); uretdione derivatives of various diisocyanates including, for example, hexamethylene diisocyanate and IPDI; isocyanurate derivatives of various diisocyanates including, for example, hexamethylene diisocyanate (commercially available under the trade designation Desmodur® N 3390 of Miles Inc.), and IPDI (commercially available under the trade designation IPDI®T 1890 polyisocyanate of Huls America, Inc., Piscataway, N.J.); and urethane adducts of diisocyanates with polyols such as, for example, ethylene glycol, propylene glycol, neopentyl glycol, trimethylolpropane, pentaerythritol and the like, as well as oligomeric and polymeric polyols, for examples, the 3:1 meta-$\alpha,\alpha,\alpha,\alpha'$-tetramethylxylenediisocyanate/trimethylolpropane adduct (commercially available under the designation CYTHANE® 3160 aliphatic polyisocyanate of Cytec Industries Inc.) and the 3:1 IPDI/trimethylolpropane adduct (commercially available under the trade designation SPENLITE® P25-A4-60 aliphatic urethane prepolymer of Reichhold Chemicals, Research Triangle Park, North Carolina).

Polyisocyanates may be blocked in well-known manner with, for example, lower alkyl alcohols and oximes.

Suitable isocyanate and carbamate functional 1,3,5-triazine carbamate crosslinkers are those having on average at least two isocyanate and/or carbamate groups attached to one or more 1,3,5-triazine cores. In general, these 1,3,5-triazine compounds are well known to those in the art.

One or more pigment colorants are another component of the liquid surface coating compositions. Useable pigment colorants include inorganic pigments such as titanium dioxide (rutile, anatase), carbon black, zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium sulfoselenides, nickel and titanium dioxide mixtures, sodium, potassium or ammonium coordination compounds of ferri-ferrocyanide, ultramarine blues (a calcimined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica, etc. Various useful organic pigments include azo pigments such as benzimidazolone pigments, pyrazolone pigments, copper phthalocyanine, quinacridones, anthraquinones, condensation pigments, tetra-chloro-isoindolinones, etc. Examples of suitable commercial pigments include: titanium dioxide white (Dupont R-960), carbon black (Degussa Special 4A or Columbian Raven 420), lamp black (General carbon LB#6), phthalo blue G (Sun 249-1282), phthalo blue R (Cookson BT698D), phthalo green B (Sun 264-0238), (G5420), light chrome yellow (Cookson Y934D), diarylide yellow (Sun 274-3954), organic yellow (Hoechst H4G), medium chrome yellow (Cookson Y969D), yellow oxide (Pfizer YL02288D), raw umber (Hoover 195), burnt umber (Lansco 3240X), lead free orange (Hoechst RL70), red oxide (Pfizer R2998D), moly orange (Cookson YL988D), arylide red (Hoechst F5RKA), quinacridone red (Ciba RT759D), and quinacridone violet (Ciba RT887D).

The matting agent component to reduce gloss of the surface coating composition in which it is incorporated is polyvinyl acetal prepared from polyvinyl alcohol and one or more aliphatic or aromatic aldehydes having one to 10, preferably four, carbon atoms. Polyvinyl butyral (PVB) is the preferred polyvinyl acetal.

Low gloss is relative to the coating composition application and is controlled by the level of matting agent in the composition and the particular polyvinyl acetal, including its molecular weight. Gloss (60°) value in this low level context ranges from about 2 to 75. When the polyvinyl acetal is the preferred PVB, its weight average molecular weight (Mw) can be between 30,000 and 250,000 Daltons, (hydroxyl group content, calculated as polyvinyl alcohol, of 12 to 20 wt. %) the amount in the composition being 2 to 16 wt. % based on the amount of binder resin. Suitable PVB's are available from Solutia, Inc. of St. Louis, Mo. as Butvar® resin, types B-72, B-74, B-76, B-79, B-90, B-98 and B-103H with B-79 (Mw of 50,000–80,000 Daltons) and B-103H (30,000–40,000 Daltons) most preferred.

In addition to the components described above, the surface coating compositions of the invention may optionally comprise a variety of additional ingredients normally used for a particular end use. For example, well known additives typically utilized in the coatings industry include, for example, foam inhibitors, leveling aids, dispersants such as pigment dispersing aids, UV absorbers, heat stabilizers, other stabilizing additives such as antioxidants and the like. When the composition is the preferred thermally activated curable liquid coating, a common additional ingredient is a cure catalyst for increasing cure rate and reducing cure temperature and/or cure time of the coating. Suitable cure catalysts include those for use in traditional amine-formaldehyde crosslinked systems, such as protic acid catalysts and Lewis acid catalysts. Examples of protic acid catalysts are sulfonic acids such as p-toluene sulfonic acid or dodecyl benzene sulfonic acid. Others include carboxylic acids such as aryl and alkyl acids, mineral acids such as phosphoric acid and pyrophosphoric acid and the like. Latent acidic catalysts, such as amine-blocked p-toluene sulfonic acid or amine-blocked dodecyl benzene sulfonic acid, are within the meaning of protic acid catalysts. Examples of Lewis acid catalysts are compounds of aluminum, boron, magnesium, antimony and tin. Cure catalysts are generally added in amounts of about 0.001 wt % to about 6.0 wt %, and preferably up to about 2.0 wt %, based on combined weight of binder resin and crosslinking agent.

The present coating compositions may also contain a solvent of the type typically present in coating applications including, for example, alcohols, ketones, esters, aliphatic hydrocarbons, aromatic hydrocarbons, halogenated hydrocarbons and the like. In waterborne coatings, the curable compositions may contain, in addition to water, a co-solvent and an aqueous dispersion-promoting material such as ethylhexanol, Texanol® (a C8-hydroxyalkyl ester of methylpropionic acid commercially available from Eastman Chemical Company), surfactants and other related materials.

The coating compositions are prepared by admixing the various components via methods and in relative amounts recognizable by those of ordinary skill in the art in the relevant field depending on the particular end use. As a general rule, for the preferred curable compositions, the binder resin and the crosslinker components are preferably admixed in an equivalents ratio (equivalents of reactive functionality) of from about 0.5:1 to about 2:1, and more preferably from about 0.8:1 to about 1.2:1.

Any conventional type of liquid coating may be prepared using the compositions described herein, including organic solvent based liquid coatings, waterborne coatings, and high temperature coil coatings. In coatings applications, the weight amounts of various reactive components depend on factors including, for example, the particular materials chosen, the presence of other reactive species and the desired end use. Based upon these variables and others, those of ordinary skill in the art should be able to adjust the composition of the coatings (including the relative amounts of the components) to achieve the desired effect.

organic solvent based liquid coatings are prepared conventionally means by adding into a commonly used organic coatings solvent the components of curable compositions and the optional ingredients, if present, in any convenient order. In organic solvent based coatings, the systems are formulated to produce a solids content level suitable for convenient application with minimal material loss, preferably at a solids content-level in the range of from about 20 weight percent to about 85 weight percent, more preferably from about 45 to about 80 weight percent, depending on the method of application chosen.

Waterborne coating compositions are prepared by combining the components of the coating in any particular order, but it is preferred to do so by preparing a dispersible composition by substantially homogeneously mixing the coating components with a surface active material (which may be an inherent property of the binder resin component), then dispersing the dispersible composition in an aqueous medium, which may comprise solely water or may contain other components such as minor amounts of water-miscible co-solvents to ease dispersion or adjust viscosity. The waterborne coating compositions may be formulated to various solids contents, generally ranging from about 20% to about 75% by weight solids, preferably from about 30% to about 55% by weight solids, depending on the method of application chosen.

The coating compositions are used by applying the coating to a substrate then drying or curing the so-applied coating to form the coating films. Liquid coatings are applied by dipping, spraying, padding, brushing, flowcoating, electrocoating or electrostatic spraying. After application the liquid carrier (e.g., organic solvent and/or water) is generally allowed to partially evaporate to produce a uniform coating on the substrate.

For the preferred thermally activated curable liquid coating compositions, full curing requires elevated temperatures generally from about 25° C. to about 375° C. depending on the components as well as the end use application. The cure temperature is typically from about 80° C. to about 160° C. In coil coating applications, the cure temperature is typically from about 250° C. to about 375° C. Cure time preferably is from about 1 second to about 30 minutes but may vary depending on the temperature chosen for cure. For example, a fully cured coil coating may be obtained by either curing at 260° C. for 1 minute or by curing at 375° C. for 20 seconds. Typical cure times for liquid coatings are in the range of from about 5 minutes to about 30 minutes.

The coating compositions may be formulated for use in numerous areas such as original equipment manufacturing (OEM), general industrial coatings including industrial maintenance coating, coatings for decorative laminated boards, paper and textiles, architectural coatings, can coatings and the like. They are usable as coatings for wire, appliances, automotive parts, furniture, pipes, machinery, and the like. Suitable substrate surfaces include metals such as steel and aluminum, plastics, wood, and glass.

Test Procedures

Gloss is measured using a BYK-Gardner Micro-Tri-Gloss apparatus at geometries of 20°, 60° and 85° according to ASTM-D-523-89, Standard Test Method For Specular Gloss. The apparatus is calibrated with a polished glass surface.

T-Bend according to ASTM-D4145-83a by bending the coated panel back on itself with coating side out. If no crack at the edge, the result is reported as zero. If the coating cracks the panel is again bent back on itself. Repeated bends back over the original bend are made until the coating does crack. The results are reported as 1T, 2T, 3T etc.

Pencil Hardness according to ASTM-D3363-92a.

Crosshatch Adhesion according to ASTM-D3359-95a, Test Method B (Cross Cut Tape Test).

Tukon Indentation Hardness (Knoop Hardness Number) according to ASTM-D1474-92.

Impact Resistance according to ASTM-G-14-88(70#/in.$^2$ considered acceptable).

Organic Solvent Resistance of cured coating by MEK (methyl ethyl ketone) Double Rub Test. Suitability depends on application; generally less than 5 is unacceptable.

The examples which follow are illustrative of preferred embodiments of the invention and are not to be construed to limit the invention in any manner. Amounts are expressed as parts by weight unless otherwise stated.

EXAMPLE 1

Coil Coating

Part 1

The ingredients listed below in this subsection are charged to a 1 liter jacketed stainless steel vessel cooled by circulating tap water (about 20° C.) through the jacket. A high speed mixer with a heavy duty dispersion propeller (Dispermat by BYK Gardner) mixes the ingredients in the vessel at 4000 rpm for at least 20 min. Then the propeller is changed to provide less intense agitation ("pearl mill" propeller), 4 oz (113g) of glass beads added and mixing at 3000 rpm continued for an additional 10 min. The TiO$_2$ pigment must be dispersed to provide at least a Hegman Gage reading of 7.5 Hegman (12 microns) or higher, the higher the number the smaller the particle size. The Hegman Gage is a two piece hand tool with a film casting blade used to draw 0.5 gm of dispersion up an inclined trough. The depth of the trough indicates relative thickness and it is at the edge of opacity where the reading is taken in Hegman units. The well-mixed dispersion is transferred to a 16 oz glass jar while being gravity filtered through a Sherwin Williams 100 micron mesh filter. The capped jar is placed on an agitation roller for 15 min.

| Formulation Component | Weight (gm) | Identity/Source |
|---|---|---|
| Binder Resin | 126.6 | (1) |
| Rheology Modifier | 0.6 | (2) |
| TiO$_2$ pigment | 82.5 | (3) |
| Organic Solvent | | |
| n-butanol | 12.6 | |
| Santosol ® DME-1 | 25.2 | (4) |

(1) Dynapol® LH 818-k05 from Creanova, a subsidiary of Degussa-Hüls Corp. Saturated, medium molecular weight, linear, hydroxylated polyester resin. 50% in AROMATIC 150/ AROMATIC®. Hydroxyl value of 15–25 (mg KOH/g).
(2) Aerosil® from Degussa-Hüls Corporation. Fumed Silica (Silion Dioxide). p0 (3) Kronos® 2310 from Kronos, Inc. Low oil absorption rutile pigment with minimum 93% Titanium Dioxide (TiO$_2$) content.
(4) Santosol® DME-1 from Solutia, Inc. High boiling solvent mixture of Dimethyl Succinate, Dimethly Glutarate and Dimethyl Adipate.

Part 2

Ingredients listed below in this subsection are charged together into a separate 16 oz (500ml) glass jar and placed on an agitation roller for about 30 min. to dissolve the crosslinker.

| | | |
|---|---|---|
| Crosslinker | 16.5 | (5) |
| Rheology Modifier | 2.4 | (6) |
| Santosol DME-1 | 9.3 | |
| Flow modifier (50% solids in xylene) | 6 | (7) |
| Curing Aid | 0.6 | (8) |
| n-butanol | 6 | |
| Santosol DME-1 | 12 | |

(5) Resimene® 747 from Solutia, Inc. High solids methylated melamine formaldehyde resin. Equivalent weight of 75–185.
(6) Cellulose Acetate Butyrate (CAB-551-0.01) from the Eastman Chemical Company. Cellulose ester with high butyryl content and low ASTM (A) viscosity.
(7) Modaflow® 2100 Resin from Solutia, Inc. 100% active flow modifier.
(8) K-Sperse® 152 from King Industries is zinc salt of organic acid. 50% active ingredient content.

Part 3

The matting agent ingredient listed below is dissolved with agitation in n-butanol to about 23% total resin solid concentration.

| | | |
|---|---|---|
| Matting agent | 42.52 | (9) |

(9) Butvar® B103H—polyvinyl butyral resin with hydroxyl equivalent weight of 270 from Solutia Inc.

The matting agent solution is added to a high speed mixer (Mixed Flow, Model 103A by Fawcett Co. Inc.) and then the ingredients from Parts 1 and 2 above are added. Contents are mixed for 30 min. with a high shear propeller blade (1000 rpm). The contents are transferred to a jar and then placed on a roller for an additional 15 min. The resulting coating formulation is placed in an ultrasonic cleaner water bath for 5 min. to remove bubbles and then applied to a 4"×12"× 0.025" Act 3003 aluminum panel. A #38 wire wound applicator rod is used to draw a wet film providing 0.8 mils dry film thickness. The aluminum panel has a thermolabel temperature gage (self-adhesive, color changing temperature gage from Paper Thermometer Company) affixed to its surface to measure peak metal temperature. The coated panel is placed in a forced air curing oven preheated to 485° F. (252°0 C.) where it is baked for 53 sec. Measured peak metal temperature is 450° F. (232° C.).

Coating performance tests according to the procedures described above are conducted. Matting agent content percentage is based on binder resin and crosslinker present. Performance data follows:

| Sample | Impact For/Rev | T-Bends | Gloss 20° | 60° | 85° | Pencil Hardness | Crosshatch Adhesion | Tukon Hardness | MEK Rubs |
|---|---|---|---|---|---|---|---|---|---|
| Control-no PVB | 70/70 | 0T | 78.3 | 89 | 94.9 | HB | 5B | 16.6 | 90 |
| B103H (12%) | 70/70 | 1T | 1.9 | 12.4 | 63.2 | HB | 5B | 19.6 | 190 |

The formulation and procedures of Parts 1, 2, and 3 above in this Example 1 are repeated except using a polyvinyl butyral matting agent of different hydroxyl equivalent weight of 230 and available as B98 from Solutia Inc. dissolved in ethanol at 22.5% solids. Performance is as follows:

| Formulation | Gloss 20° | Gloss 60° | Gloss 85° | Impact | T-Bends | Pencil Hardness | Crosshatch Adhesion | Tukon Hardness | MEK Rubs |
|---|---|---|---|---|---|---|---|---|---|
| Control | 80.1 | 90.7 | 100 | 70/70 | OT | HB | 5B | 16.4 | 165 |
| B98-4% | 5.8 | 40.3 | 83.9 | 70/70 | OT | HB | 5B | 17.9 | 200 |
| B98-8% | 2 | 13.6 | 60.6 | 70/70 | OT | HB | 5B | 19 | 200 |
| B98-12% | 1 | 3 | 16.6 | 70/70 | OT | HB | 5B | >30 | 125 |
| B98-16% | 1 | 2.8 | 5 | 70/70 | OT | B | 5B | — | .62 |
| B98-20% | 1.2 | 5.2 | 21 | 70/70 | OT | 4H | 5B | — | 88 |

The above data shows a marked reduction in gloss of the coating film over the control (no matting agent) using polyvinyl butyral matting agent without adverse effect on other measured coating performance properties.

EXAMPLE 2

Catalyzed Lower Temperature Cure Coating

The procedure of Example 1 is repeated through the bubble removal step using the noted ingredients except i) the matting agent is polyvinyl butyral resin (B98) from Solutia Inc. dissolved in ethanol to about 26% total solids concentration and ii) before the bubble removal step 2.03 gms. of cure catalyst is added to the coating formulation (K-Cure 1040 from King Industries which is p-toluene sulfonic acid dissolved in isopropanol (40% solids). The coating formulation is applied on a 4"×12"×0.032" P95 steel panel from Act Laboratories; a draw down bar with a blade clearance of 5 mils is used to give a dry film 35 thickness of 1.0 mil. The wet coating is flashed at ambient temperature for 15 min. to remove excess solvent and then cured at 200° F. (93° C.). in an oven for 30 min. Coating performance results are as follows:

| Formulation Component | Weight(gm) | Identity/Source |
|---|---|---|
| Part 1 | | |
| Binder resin | 170.3 | (1) |
| Methyl n-amyl ketone (MAK) solvent | 77.1 | |
| TiO$_2$ pigment | 361.9 | (2) |
| Wetting agent | 0.03 | (3) |
| Flow surface modifier | 0.8 | (4) |
| Part 2 | | |
| Binder resin | 81.4 | (1) |
| n-Butyl acetate | 122.9 | |
| MAK | 103.2 | |
| Catalyst | 2 | (5) |

(1)Chempol ® 11-2339 from Cook Composites and Polymers Inc. Polyester resin, 94% minimum solids. Hydroxyl number (on solids) is 240.
(2)Ti-Pure ® Rutile R960 from DuPont, 89% titanium dioxide.
(3)Byk ® P-104S from BYK-Chemie. Solution (50% non-volatile) of a lower molecular weight unsaturated polycarboxylic acid polymer with a polysiloxane copolymer.
(4)Fluroad FC-430 from 3M. 100% active fluoroaliphatic polymeric esters.
(5)Dibutyltin dilaurate (DBTDL), T-12 (10% in MAK) from M&T Chemicals.

| | Impact For/Rev | T-bends | Gloss 20° | Gloss 60° | Gloss 85° | Pencil Hardness | Crosshatch Adhesion | Tukon Hardness | MEK Rubs |
|---|---|---|---|---|---|---|---|---|---|
| Control | 160/160 | OT | 77.8 | 93.3 | 98.9 | F | 5B | 13.3 | 200 |
| B98-Matting Agent @ 8%* | 160/160 | 1T | 15 | 57.6 | 81.9 | HB | 5B | 12.4 | 200 |

EXAMPLE 3

Isocyanate Cured Coating

The procedure of Example 1, Parts 1 and 2 is repeated using the following ingredients:

Matting agent (MA) is PVB as Butvar B79 from Solutia Inc., 50K-80K Mw, dissolved in n-butanol to 23% total solids.

Parts 1 and 2 ingredients and the matting agent solution are combined in a capped jar and placed in a hot water bath for 1 hr @ 60° C. then roll mixed for 15 min. and cooled to ambient temperature.

Polyisocyanate crosslinker (201 gm) as Luxate® HT 2000, from Olin, aliphatic polyisocyanate with NCO equivalent average weight of 190 is diluted with 30 gm n-butyl acetate and added to the contents of the jar noted above. This coating formulation is roll mixed at room temperature for 10 min., air bubbles removed in an ultrasonic cleaner for 5 min. and applied to steel test panels (1.7 mil dry thickness), cured at ambient (23° C.) temperature for 14 days and tested for performance. Results follow:

|  | Gloss | | | Tukon | Pencil Hardness | Cross Hatch | Impact For/Rev | T-Bend | MEK |
| --- | --- | --- | --- | --- | --- | --- | --- | --- | --- |
|  | 20° | 60° | 85° | | | | | | |
| Control | 86.6 | 93.3 | 97.7 | 1.7 | HB | 5B | 160/160 | 2T | 200-Mar |
| B79-MA @ 4%* | 1.4 | 4.9 | 44.6 | NoMark | HB | 5B | 160/160 | 1T | 200-Mar |

EXAMPLE 4

Thermoplastic Coating

A thermoplastic coating is prepared using polycaprolactone thermoplastic resin as Tone® Polymer P-767, from Union Carbide Corp. according to the formulation identified below containing PVB matting agents (called B98, B79 and B90) at two matting agent concentrations (based on binder resin in the coating formulation). Coated panels are dried at 194° F. (90° C.). for 5 min. Gloss properties are as noted.

| Formulation | Control | B98 | | B79 | | B90 | |
| --- | --- | --- | --- | --- | --- | --- | --- |
| | | 4% | 10% | 4% | 10% | 4% | 10% |
| Polycaproloctone (23% in PM Acetate) | 20 | 20 | 20 | 20 | 20 | 20 | 20 |
| Kronos 2310 | 3.69 | 3.69 | 3.69 | 3.69 | 3.69 | 3.69 | 3.69 |
| Aerosil 200 | 0.06 | 0.06 | 0.06 | 0.06 | 0.06 | 0.06 | 0.06 |
| n-butanol | 1 | 1 | 1 | 1 | 1 | 1 | 1 |
| Santosol DME-1 | 0.4 | 0.4 | 0.4 | 0.4 | 0.4 | 0.4 | 0.4 |
| B98 (25% in ethanol) | | 0.73 | 1.83 | | | | |
| B79 (23% in ethanol) | | | | 0.81 | 2.1 | | |
| B90 (18% in ethanol) | | | | | | 1 | 2.6 |

| | Gloss Performance | | |
| --- | --- | --- | --- |
| | 20° | 60° | 85° |
| Control | 73.9 | 88 | 102.8 |
| B98-4% | 2.5 | 16.8 | 23.6 |
| B98-10% | 2.7 | 17.9 | 16.2 |
| B79-4% | 1.3 | 5.2 | 11 |
| B79-10% | 1.1 | 2.3 | 3.9 |
| B90-4% | 1.7 | 9.5 | 10.2 |
| B90-10 | 1.4 | 6 | 3.8 |

EXAMPLE 5

Vinyl Formal Matting Agent

The procedure of Parts 1, 2 and 3 of Example 1 is repeated using the components, sources and amounts therein noted except the matting agent in Part 3 is a 13.6 % solution of polyvinyl formal in THF from Aldrich Chemical Co.

| Formulation | Gloss | | | Tukon | Cross Hatch | Impact For/Rev | T-Bend | MEK |
| --- | --- | --- | --- | --- | --- | --- | --- | --- |
| | 20° | 60° | 85° | | | | | |
| Control | 74.4 | 88.6 | 100.3 | 15.6 | 5B | 70/70 | 0T | 200+ |
| 4% Formal | 52.4 | 78.8 | 89.5 | 14.1 | 5B | 70/70 | 0T | 85 |
| 8% Formal | 22.6 | 62.1 | 81.2 | 18.6 | 5B | 70/70 | 1T | 31 |
| 16% Formal | 6.1 | 38 | 64.3 | 23.9 | 5B | 70/70 | 1T | 200 |

EXAMPLE 6

Mixed Aldehyde Polyvinyl Acetal Matting Agent

The procedure of Parts 1, 2 and 3 of Example 1 is repeated using the components, sources, and amounts noted therein except the matting agents in Part 3 are i) polyvinyl acetal prepared from polyvinyl alcohol and a 1/1 mixture of butyaldehyde and acetaldehyde (called "1107H") and ii) a commercial version of such mixed aldehyde PVA from Wacker Chemie as Pioloform® LB16 (called "LB16"). Both are dissolved as a 25% solution in ethyl alcohol. Results follow:

| Formulation | Gloss | | | Tukon | T-Bend | MEK Rub |
| --- | --- | --- | --- | --- | --- | --- |
| | 20° | 60° | 85° | | | |
| Control | 75.1 | 85.7 | 99.1 | 15.5 | 0T | 100 |
| 107H-4% | 42.3 | 76.1 | 99.3 | 15.3 | 0T | 200 |
| 107H-8% | 20.9 | 50.4 | 68.4 | 15.2 | 0T | 140 |
| 107H-16% | 6.6 | 43.1 | 89.6 | 17 | 0T | 150 |
| LB16-4% | 38.7 | 72.1 | 94.6 | 16 | 0T | 200 |
| LB16-8% | 53.7 | 81.6 | 81.6 | 15.6 | 0T | 200 |
| LB16-16% | 28.5 | 71.2 | 71.2 | 17.4 | 0T | 200 |

EXAMPLE 7

Polyvinyl Octyl Aldehyde Acetal (POA) Matting Agent

Polyvinyl octyl aldehyde acetal (hydroxyl equivalent weight of 190) is dissolved in N,N-dimethyl formamide to give a 9.35% solids matting agent solution.

The procedure of Example 1, parts 1, 2 and 3 is repeated using the components, sources and amounts recited therein except the matting agent is derived from $C_8$ aliphatic aldehyde as noted above in this example.

More particularly, the Part 1 dispersion and matting agent are charged to a 1 liter stainless steel vessel. A BYK- Gardner, Dispermat, High-Speed Dissolver is used in the vessel with a heavy duty dispersion propeller to mix Part 1 dispersion at high shear rates of 4000 RPM for at least 20 minutes, to at least a Hegman Gauge reading of 7.5 Hegman or higher (12 microns). Heating (below 60° C.) may be done before grinding to promote mixing. Then part 2, is added to the noted jar and mixed for 30 minutes. This formulation is then rolled on an agitation roller for 15 minutes and placed in an ultrasonic cleaner for 10 minutes to remove air bubbles. A No. 36 wire rod is used to make a coating film on an aluminum panel. A flash time of 15 minutes is allowed and the panel then cured at 450° F. (232° C.) for 53 seconds. Dry film thickness is about 0.7–0.8 mils. Twenty-four hours is allowed to pass before testing of the coating on the panel. Results follow:

| Formulation | Gloss | | | T-Bends | Pencil Hardness | Cross Hatch | Impact | MEK Rubs |
|---|---|---|---|---|---|---|---|---|
| | 20° | 60° | 85° | | | | | |
| Control | 70.6 | 85.3 | 95.3 | 0T | F | 5B | 70/70 | 200 |
| POA-2% | 2 | 12.7 | 20.1 | 0T | H | 5B | 70/70 | 150 |

EXAMPLE 8

Polyvinyl Benzaldehyde Acetal (PBA)

Polyvinyl benzaldehyde acetal (hydroxyl equivalent weight of 210) is dissolved in Dowanol PM solvent to give a 16% solids matting agent solution.

The procedure of Example 7 is repeated using the components and sources of Example 1 (except Ti $O_2$ is Kronos 2020 93.5% $TiO_2$ content) and the amounts are doubled. Matting agent is derived from $C_7$ aromatic aldehyde noted above in this example. Results follow:

| Formulation | Gloss | | | T-Bend | Tukon | Pencil Hardness | Cross Hatch | Impact | MEK Rubs |
|---|---|---|---|---|---|---|---|---|---|
| | 20° | 60° | 85° | | | | | | |
| Control | 70.6 | 85.3 | 95.3 | 0T | 11 | F | 5B | 70/70 | 200 |
| PBA-8% | 3.3 | 27.6 | 54.6 | 0T | 20.8 | 4H | 5B | 70/70 | 200 |

The preceding description is for illustration and should not be taken as limiting. Various modifications and alterations will be readily suggested to persons skilled in the art. It is intended, therefore, that the forgoing be considered as exemplary only and that the scope of the invention be ascertained from the following claims.

We claim:

1. A liquid surface coating composition which, after curing or drying, exhibits low gloss, the composition comprising in admixture:
    a) binder resin other than polyvinyl acetal;
    b) pigment colorant; and
    c) a gloss-reducing amount of a matting agent consisting essentially of polyvinyl acetal containing acetal groups derived from one or more aliphatic or aromatic aldehydes having 1 to 10 carbon atoms.

2. The composition of claim 1 wherein the polyvinyl acetal is polyvinyl butyral of weight average molecular weight between 10,000 and 500,000 Daltons having hydroxyl group content between 8 to 25 wt. %.

3. The composition of claim 2 wherein the amount of polyvinyl butyral in the coating composition is about 0.5 wt. % to about 25 wt. % based on the amount of a).

4. A liquid surface coating composition which, after curing or drying, exhibits low gloss, the composition comprising in admixture:
    a) a thermoplastic binder resin other than polyvinyl acetal;
    b) pigment colorant; and
    c) a gloss-reducing amount of a matting agent consisting essentially of polyvinyl butyral;
wherein the polyvinyl butyral has a weight average molecular weight between 10,000 and 500,000 Daltons having hydroxyl group content between 8 to 25 wt. %; and the amount of polyvinyl butyral in the coating composition is about 0.5 wt. % to about 25 wt. % based on the amount of a).

5. A thermally activated curable liquid coating composition comprising, in admixture:
    a) crosslinking agent selected from the group consisting of alkoxymethylaminotriazines and polyisocyanates;
    b) binder resin having functional groups coreactive with the crosslinking agent;
    c) polyvinyl acetal matting agent containing acetal groups derived from one or more aliphatic or aromatic aldehydes having 1 to 10 carbon atoms; and
    d) pigment colorant.

6. The composition of claim 5 wherein the binder resin is selected from the group consisting of acrylic resins, epoxy resins and polyester resins.

7. The composition of claim 6 wherein the matting agent is polyvinyl butyral of weight average molecular weight between 30,000 and 250,000 Daltons with hydroxyl group content between 12 to 20 wt. %.

8. An uncovered, low gloss surface coating containing polyvinyl acetal matting agent in amount effective to produce a gloss reading of less than 60 using a glossmeter at an angle of sixty degrees to normal.

9. The coating of claim 8 containing crosslinked binder resin.

10. The coating of claim 8 containing thermoplastic binder resin.

11. The coating of any of claims 8, 9 or 10 wherein the gloss reading is less than 15.

* * * * *